United States Patent [19]
Wilson et al.

[11] Patent Number: 6,135,472
[45] Date of Patent: Oct. 24, 2000

[54] MOTOR POWERED RUNNING BOARD

[75] Inventors: Kevin Wilson, Lexington; Craig A. Stapleton, Clarkston; John E. Klinkman, Clinton Township, all of Mich.

[73] Assignee: SportRack LLC, Sterling Heights, Mich.

[21] Appl. No.: 09/159,444

[22] Filed: Sep. 24, 1998

Related U.S. Application Data

[60] Provisional application No. 60/059,890, Sep. 24, 1997.

[51] Int. Cl.$^7$ ........................................... B60R 3/00
[52] U.S. Cl. ........................................ 280/166; 280/164.1
[58] Field of Search ................................ 280/163, 164.1, 280/164.2, 166, 169; 293/128

[56] References Cited

U.S. PATENT DOCUMENTS

| | | | |
|---|---|---|---|
| 2,797,104 | 6/1957 | Drobney et al. | 280/166 |
| 3,762,742 | 10/1973 | Bucklen | 280/166 |
| 4,110,673 | 8/1978 | Nagy et al. | 280/166 X |
| 4,116,457 | 9/1978 | Nerem et al. | 280/166 |
| 4,185,849 | 1/1980 | Jaeger | 280/166 |
| 5,193,829 | 3/1993 | Holloway et al. | 280/163 |
| 5,358,268 | 10/1994 | Hawkins | 280/163 X |
| 5,697,626 | 12/1997 | McDaniel et al. | 280/166 |

FOREIGN PATENT DOCUMENTS 402216337  8/1990  Japan ................................ 280/166

*Primary Examiner*—Brian L. Johnson
*Assistant Examiner*—Bryan Fischmann
*Attorney, Agent, or Firm*—Rader, Fishman & Grauer PLLC

[57] ABSTRACT

A movable running board system which includes a running board which is supported by a movable under carriage. The movable under carriage is coupled to a motor wherein the motor is capable of moving the running board between a fully extended position and a retracted position. The motor is coupled to a motor controller which receives a signal from a door position switch. When the door position switch indicates that the vehicle door is opened, the motor controller commands the motor to manipulate the running board to a fully extended position. Once the vehicle door is closed the door position sensor sends the "closed door" signal to the motor controller which, then in turn, commands the motor to retract the running board into the retracted position.

12 Claims, 2 Drawing Sheets

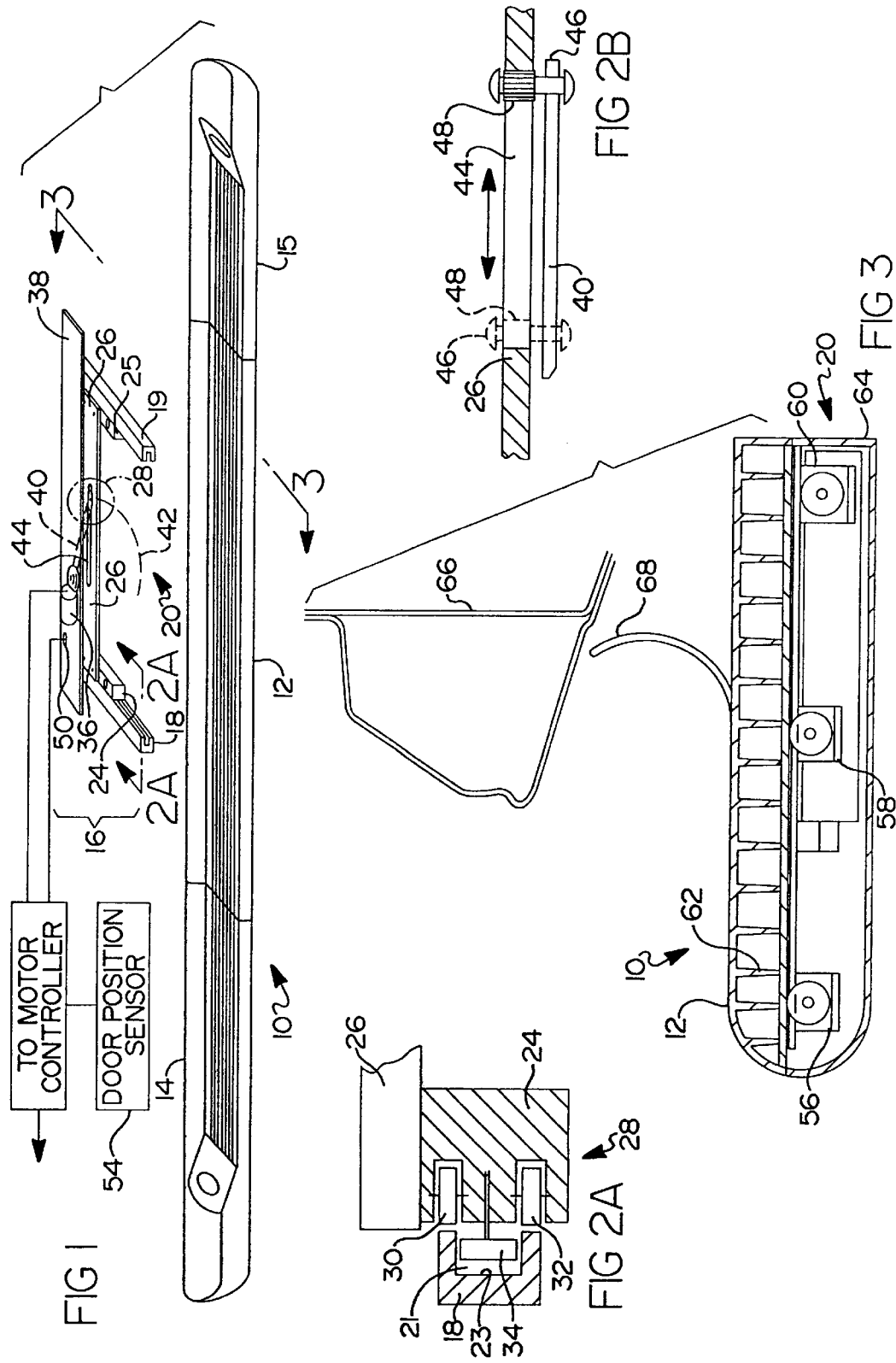

MOTOR POWERED RUNNING BOARD

RELATED APPLICATIONS

This application claims the benefit of provisional application Ser. No. 60/059,890 filed Sep. 24, 1997.

TECHNICAL FIELD

This application relates to vehicle running boards and more particularly relates to motorized running boards.

BACKGROUND OF THE INVENTION

Utility trucks and other large vehicles typically employ running boards. Running boards reside under the access doors of the vehicle to provide a surface whereby the driver and passengers can gain a foothold for entering and exiting the vehicle. In applications where the running board is located in a fixed position (i.e. not movable), its placement is problematic. For example, if it is fixed too far from the vehicle side, its appearance becomes gangly and protruding and may provide a risk of injury to those walking close to the vehicle. If it is located too close to the vehicle, it may not offer sufficient surface area to allow the person exiting the vehicle to gain a sufficient foothold with the heel of their shoe in order to safely exit the vehicle. In these situations, the running board may pose a risk which enables the person exiting the vehicle to slip off of the running board, or perhaps miss the running board altogether.

Thus, it is an object of this invention to provide a motorized running board wherein the running board is movable between an extended position and a retracted position. In the extended position, the running board provides a greater foothold area than that which is available in the retracted position. When the vehicle door is opened, the running board (by way of motor control) is manipulated from its retracted position to its extended position, thereby allowing the person entering or exiting the vehicle to gain an ample foothold. Once the vehicle door is closed, the running board is retracted.

BRIEF DESCRIPTION OF THE DRAWINGS

FIG. 1 is a partially exploded view of the motorized running board of the present invention shown in its retracted position.

FIG. 2A is partial cross-sectional view taken substantially through lines 2A—2A of FIG. 1.

FIG. 2B is an enlarged view of encircled portion labeled 2B of FIG. 1.

FIG. 3 is a partial cross-sectional view taken substantially through lines 3—3 of FIG. 1.

DETAILED DESCRIPTION OF THE PREFERRED EMBODIMENTS

Figure 4:
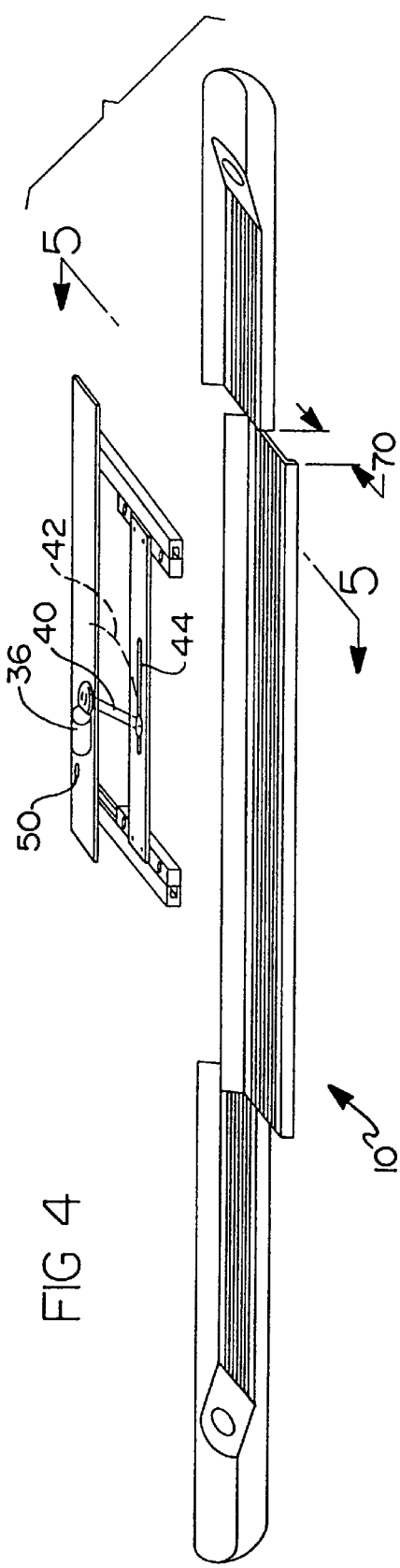
FIG. 4 is a partial exploded view of the motorized running board of the present invention shown in its extended position.

Now referring to FIG. 1, running board 10 is comprised of movable segment 12 and nonmovable segments 14, 15. Nonmovable segments 14, 15 are supported by a support structure (not shown) which is typically anchored to the under carriage of the vehicle and, can also be attached, to the wheel well areas of the vehicle. Movable segment 12 is supported by running board support assembly 16. Running board support assembly 16 is comprised of right and left slide channels 18, 19 and roller carriage 20. Slide channels 18, 19 are nonmovably fastened to the under carriage of the vehicle and include slots 21 (see FIG. 2) for supporting roller carriage 20.

Roller carriage 20 includes a pair of spaced roller carriage side rails 24, 25 which are joined in fixed relationship by roller carriage cross rail 26. Roller carriage side rails 24, 25 each include at least two sets of wheel assemblies fastened along the length of each roller carriage side rail 24, 25. The wheel assemblies 28 are best depicted in FIG. 2 and are preferably comprised of first and second horizontal wheels 30, 32 and vertical wheel 34. Horizontal wheels 30, 32 are designed to engage vertical, load bearing surface 23 of slide channels 18, 19 to absorb any vertical load which exists between slide channels 18, 19 and their respectively associated roller carriage side rail 24, 25. Vertical wheel 34 is positioned within slot 21 and functions to bear any vertical load exerted on movable segment 12 (such as when movable segment 12 is stepped upon). The structure shown in FIG. 2 is duplicated in at least two locations along support channel 18 and roller carriage side rail 24 and is also duplicated in at least two locations along side channel 19 and roller carriage side rail 25.

Motor 36 is mounted upon cross brace 38. Motor drive arm 40 is affixed, at one end, to the rotational output shaft of motor 36 and is designed to swing along arcuate path 42. At its opposite end, motor drive arm 40 is slidingly pinned within slot 44 of roller carriage cross rail 26 (see FIG. 2B). Pin 46 is rigidly connected to motor drive arm 40 and contains rotating sleeve 48 which surroundingly engages an uppermost portion of pin 46. Sleeve 48 is sized so that it freely rotates around pin 46 and freely slides within the confines of slot 44. Thus when motor 36 is activated, arm 40 swings through arcuate path 42 thereby urging roller carriage cross rail 26 toward the extended position. Because of the fixed relationship between roller carriage cross rail 26, roller carriage side rails 24, 25 and movable segment 12, this arcuate motion is effective for moving movable segment 12 into an extended position.

Preferably, a limit switch 50 is located on cross brace 38 so that the fully extended and the fully retracted position of roller carriage 20 can be known by the motor controller. Also, the motor controller must have access to door position sensor 54 so that the motor controller can send the command signal to motor 36 whenever the vehicle door is open.

Now referring to FIG. 3, in a preferred embodiment, roller carriage 20 includes three sets of wheel assemblies 56, 58 and 60, each wheel set being identical to wheel assembly 28 shown in FIG. 2A. Moveable segment 12 is preferably fabricated with honeycomb ribbing 62 on its underside to improve its load bearing characteristics. Roller carriage 20, side rails 18, 19, motor 36, and arm 40 are preferably protected from environmental elements by cover 64. Cover 64 is effective for preventing road debris, salt, ice, and the like from contacting roller carriage 20, slide channels 18, 19, motor 36, and arm 40 which, if left unprotected, would suffer an accelerated performance deterioration motor 36, and arm 40 slide as they age. Preferably, running board 10 is positioned immediately below rocker panel 66 and exterior trim 68 (if any).

Figure 5:
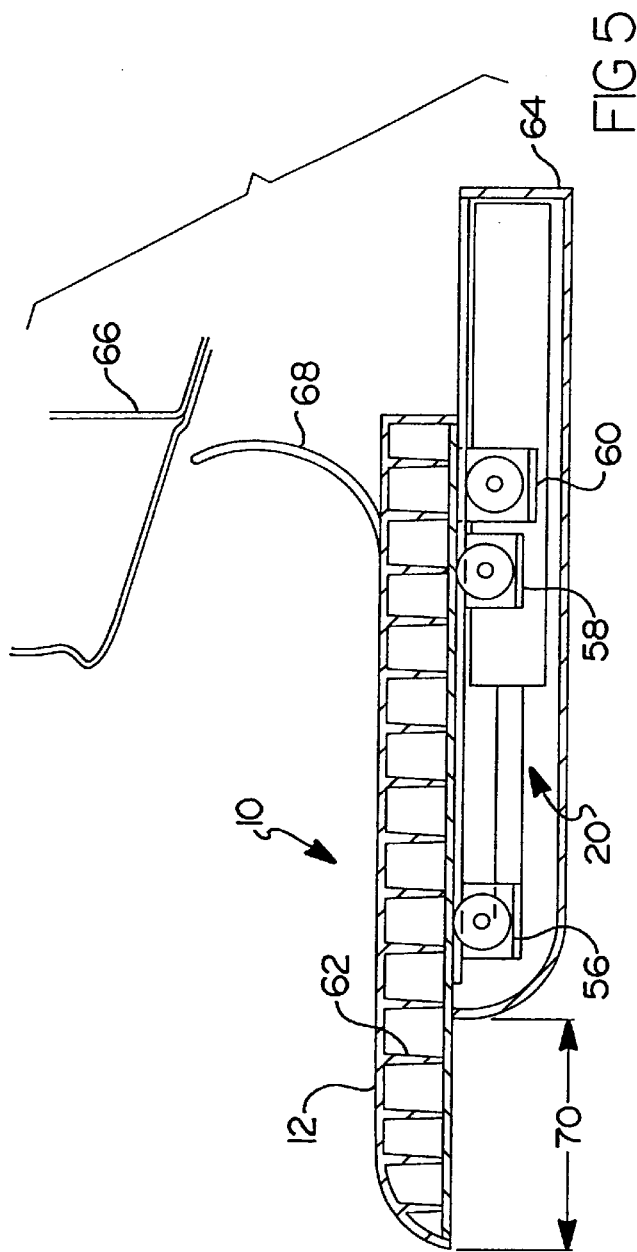
FIG. 5 is a partial cross-sectional view taken substantially through lines 5—5 of FIG. 4.

FIGS. 4 and 5 depict running board 10 in its extended 70 position.

When the vehicle door is opened, door position sensor 54 sends a signal to motor controller (motor controller not shown), and motor controller acts on this signal to activate motor 36. When motor 36 is activated it translates motor arm 40 along arcuate path 42 thereby extending roller carriage 20 outwardly. Movable segment 12 is fixed to the top of roller carriage 20 and accordingly movable segment 12 is moved into its fully extended position. When movable segment 10 is in its fully extended position, it presents a greater surface area to the person entering the vehicle thereby minimizing the ease of entry. Once the door is closed, door position sensor 54 sends the signal to motor controller which activates motor 36 to manipulate arm 40 into the retracted position thereby manipulating movable segment 12 into the fully retracted position.

The foregoing detailed description shows that the preferred embodiments of the present invention are well suited to fulfill the objects of the invention. It is recognized that those skilled in the art may make various modifications or additions to the preferred embodiments chosen here to illustrate the present invention, without departing from the spirit of the present invention. For example, the specific embodiment of motor 36 has been limited to electric motors; however, it is understood by those skilled in the art that hydraulic operated rams or motors, vacuum motors, or pneumatic devices could easily be substituted for electric motor 36. Additionally, although arm 40 has been depicted moving in an arcuate matter, it will be understood by those skilled in the art that any number of standard drive mechanisms can be used to translate the movement generated by motor 36 into the linear movement of roller carriage 20. Such mechanisms include rack and pinion devices and rectilinear drive mechanisms. Accordingly, it is to be understood that the subject matter sought to be afforded protection hereby, should be deemed to extent to the subject matter defined in the appended claims, including all fair equivalence thereof.

What is claimed is:

1. A moving running board system for use on a vehicle, comprising:

means for translating movement of at least a portion of a running board between first and second positions, motorized means, coupled to said translating means, for powering the translating movements of at least a portion of said running board, means, coupled with said motorized means, for sensing a position of a door of said vehicle wherein said means for translating includes at least two sets of wheel assemblies, wherein each set of wheel assemblies includes at least one vertical wheel and one horizontal wheel.

2. The moving running board system of claim 1, wherein said translating means includes a roller carriage coupled to a slide channel.

3. The moving running board system of claim 1, wherein said motorized means includes at least an electric motor, a hydraulic motor, a pneumatic or a vacuum motor.

4. The moving running board system of claim 1, wherein said means for translating is covered to prevent exposure to road contaminates.

5. The moving running board system of claim 1, wherein said motorized means is coupled to said translating means by way of an arm capable of moving along a radial path.

6. A movable running board assembly for use on a vehicle comprising:

a running board;

running board support assembly coupled to at least a portion of said running board, said support assembly adapted to translate the position of said running board between a first, retracted position and a second, extended position, a motor coupled to at least one of said running board or said running board support assembly for powering said running board between said first and second positions wherein said running board support assembly includes at least two sets of wheel assemblies, wherein each set includes at least one horizontal wheel and one vertical wheel.

7. The moving running board assembly of claim 6, wherein said running board support assembly includes at least two sets of wheel assemblies, wherein each set includes two horizontal wheels and one vertical wheel.

8. The moving running board assembly of claim 6, wherein said running board support assembly includes a roller carriage coupled to a slide channel.

9. The moving running board assembly of claim 7, wherein said motor 10 selected from the set consisting of an electric motor, a pneumatic motor, a vacuum motor and a hydraulic motor.

10. The moving running board assembly of claim 6, wherein said at least said two sets of wheels and said motor are covered to protect them from road contaminates.

11. The moving running board assembly of claim 6, wherein said motor is coupled to said running board by way of a motor driven arm which said motor manipulates along an arcuate path.

12. The moving running board assembly of claim 6, wherein said running board is fabricated from a honeycomb member.

\* \* \* \* \*